(12) United States Patent
Chen et al.

(10) Patent No.: US 7,193,940 B2
(45) Date of Patent: Mar. 20, 2007

(54) PRE-PIT SIGNAL DECODER

(75) Inventors: Hao-Cheng Chen, Chung Ho (TW); Wen-Yi Wu, Hsin Chu County (TW)

(73) Assignee: MediaTek Inc., Hsin Chu (TW)

(*) Notice: Subject to any disclaimer, the term of this patent is extended or adjusted under 35 U.S.C. 154(b) by 683 days.

(21) Appl. No.: 10/706,037

(22) Filed: Nov. 13, 2003

(65) Prior Publication Data
US 2004/0136285 A1 Jul. 15, 2004

(30) Foreign Application Priority Data
Nov. 15, 2002 (TW) .............................. 91133572 A

(51) Int. Cl.
*G11B 7/00* (2006.01)
(52) U.S. Cl. .................. 369/47.22; 369/53.34
(58) Field of Classification Search ............ 369/47.22, 369/47.21, 47.2, 47.15, 47.1, 53.34, 44.13
See application file for complete search history.

(56) References Cited
U.S. PATENT DOCUMENTS
6,091,682 A * 7/2000 Hikima ...................... 369/47.2

* cited by examiner

*Primary Examiner*—Ali Neyzari
(74) *Attorney, Agent, or Firm*—Birch, Stewart, Kolasch & Birch, LLP

(57) ABSTRACT

A pre-pit signal decoder includes a shift register, a pattern comparator, a counting unit, an in-sync signal generating unit and a protection unit. The register receives serial pre-pit bits and converts them into a parallel pre-pit byte. The comparator generates an odd sync bit, an even sync bit, a low bit, and a high bit according to the pre-pit byte and receives a disable signal to operate when the disable signal is not enabled. The counting unit generates a counting value, which marks oddness/evenness of frames of the pre-pit bits and sequence of wobble signals in the frames, according to the odd sync, even sync, low and high bits. The signal generating unit generates an in-sync signal according to the odd sync, even sync, low, and high bits. The protection unit receives the counting value and the in-sync signal to thereby enable the disable signal at positions where the pre-pit bits impossibly exist according to the counting value. The decoder controls operations of the pattern comparator according to the disable signal of the protection unit so as to reduce the error rate.

15 Claims, 7 Drawing Sheets

PRE-PIT SIGNAL DECODER

This Nonprovisional application claims priority under 35 U.S.C. 119(a) on Patent Application No(s). 091133572 filed in TAIWAN on Nov. 15, 2002, the entire contents of which are hereby incorporated by reference.

BACKGROUND OF THE INVENTION

1. Field of the Invention

The invention relates to a pre-pit signal decoder, and more particularly to a pre-pit signal decoder having a protection unit.

2. Description of the Related Art

In a typical DVD-R/RW (Digital Versatile Disk Recordable), a pre-pit for recording the address information is additionally formed at a position between adjacent tracks in order to correctly detect the frequency of the wobbling track. FIG. 1 shows a cross-sectional view of an optical disk. Referring to FIG. 1, the number 2 represents a groove, the number 3 represents a land, and the number 4 represents a pre-pit. Because the pre-pits have been uniformly formed on an entire surface of the DVD-R/RW after the disk is manufactured, the reference addresses of the DVD-R/RW may be reproduced from the pre-pits.

According to the DVD-R/RW specification, each error correction code (ECC) block is composed of 16 sectors, and each sector is composed of 26 frames. The 26 frames may be divided into even frames and odd frames. Each frame has 8 wobble cycles, and the length of each cycle is 186T. Thus, the length of each frame is 1488T, wherein T represents a basic data cycle. Each pre-pit bit is determined by three low bits (b2, b1, b0) in each frame, as shown in Table 1.

Each ECC block contains 13 sets of pre-pit bits, so a set of pre-pit bits appears on every two frames, and the set of pre-pit bits originally appears on the position of the even frame. However, when the pre-pit bit appears on the same position for the adjacent tracks, the pre-pit bit will be shifted to the position of the odd frame. That is, if the pre-pit bit appears on the position of the even frame, it cannot appear on the position of the odd frame. On the contrary, if the pre-pit bit does not appear on the position of the even frame, it will surely appear on the position of the odd frame.

TABLE 1

| Information | b2 | b1 | b0 |
|---|---|---|---|
| Pre-pit bit is an even sync code | 1 | 1 | 1 |
| Pre-pit bit is an odd sync code | 1 | 1 | 0 |
| Pre-pit bit is 1 | 1 | 0 | 1 |
| Pre-pit bit is 0 | 1 | 0 | 0 |

A pre-pit signal is typically generated from a differential push-pull signal using a pre-pit signal detector, and then a pre-pit byte is generated using a pre-pit decoder. Since the differential push-pull signal is an analog signal, the pre-pit signal detector mostly utilizes a slicer to slice the differential push-pull signal and then generate the pre-pit signal, which may contain noise. Consequently, if the pre-pit decoder decodes using only the pre-pit bit corresponding to the pre-pit signal of Table 1, error data may be produced.

SUMMARY OF THE INVENTION

In view of the above-mentioned problems, an object of the invention is to provide a pre-pit signal decoder having a protection unit.

To achieve the above-mentioned object, the invention provides a pre-pit signal decoder including a shift register, a pattern comparator, a counting unit, an in-sync signal generating unit and a protection unit. The shift register receives serial pre-pit bits and converts them into a parallel pre-pit byte. The pattern comparator generates an odd sync bit, an even sync bit, a low bit, and a high bit according to the parallel pre-pit byte and receiving a disable signal to operate when the disable signal is not enabled. The counting unit generates a counting value, which marks oddness/evenness of frames of the pre-pit bits and sequence of wobble signals in the frames, according to the odd sync bit, even sync bit, low bit and high bit. The in-sync signal generating unit generates an in-sync signal according to the odd sync, even sync, low, and high bits. The protection unit receives the counting value of the counting unit and the in-sync signal to thereby enable the disable signal at positions where the pre-pit bits impossibly exist according to the counting value of the counting unit.

Therefore, the pre-pit signal decoder of the invention utilizes the protection unit to generate a disable signal to control the operation of the pattern comparator so as to disable the pattern comparator from outputting a signal at positions where the pre-pit bit cannot exists, and to effectively prevent the pattern comparator from outputting an error signal.

DETAILED DESCRIPTION OF THE INVENTION

The pre-pit signal decoder of the invention will be described with reference to the accompanying drawings.

Figure 1:
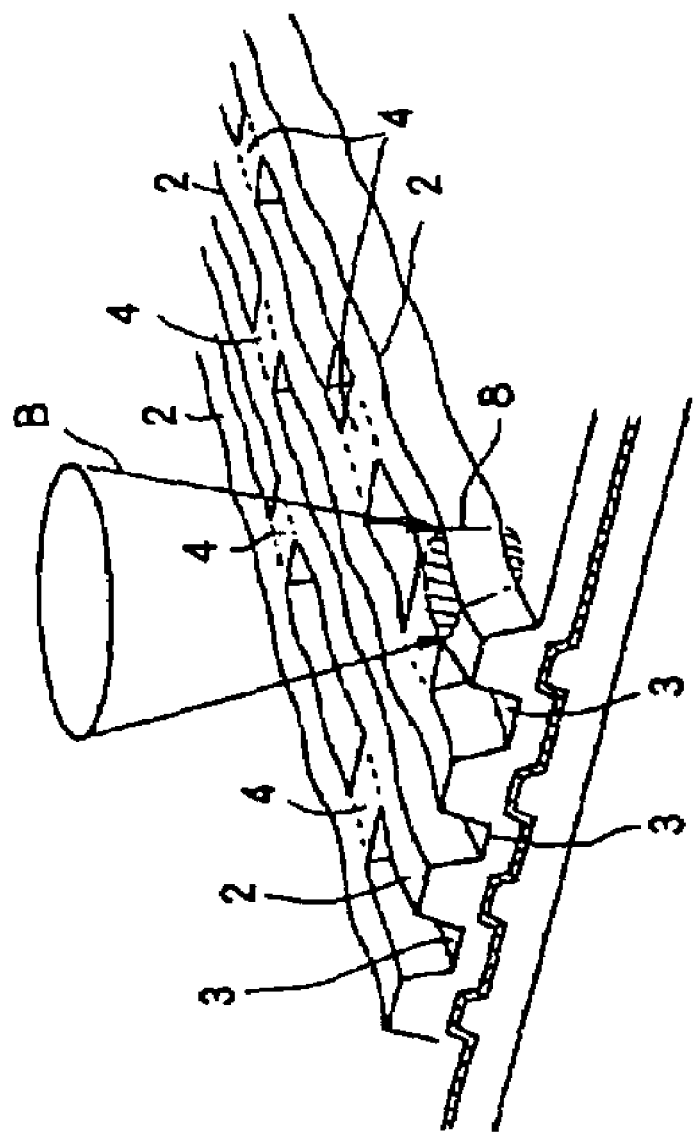
FIG. 1 shows a cross-sectional view of an optical disk.
Figure 2:
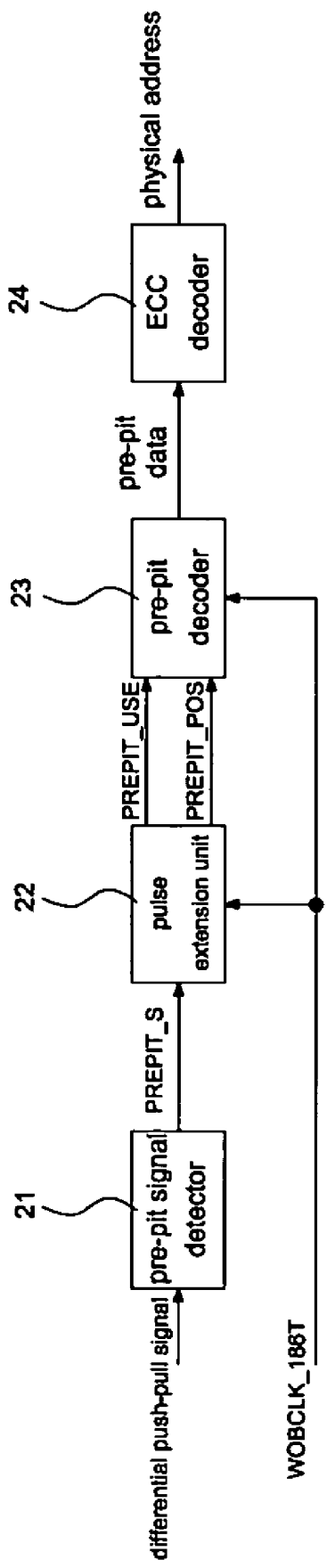
FIG. 2 shows a block diagram for generating a physical address of DVD-R/RW of this invention.

FIG. 2 shows a block diagram for generating a physical address of DVD-R/RW of this invention. As shown in FIG. 2, the invention utilizes a pre-pit signal detector 21 to receive a differential push-pull signal reproduced from the disk, and to generate a pre-pit signal. A typical pre-pit signal detector utilizes a slicer to slice the differential push-pull signal and then to generate the pre-pit signal. Since the differential push-pull signal is an analog signal, which tends to be interfered by noise, and a level of a reference signal of the slicer may not be an optimum value, the pre-pit signal may also has noise. Consequently, the invention utilizes a pulse extension unit 22 to receive the pre-pit signal, and to generate control signals, including an extension signal PREPIT_EXT, a pre-pit address signal PREPIT_POS, and a pre-pit use signal PREPIT_USE, according to a wobble signal reference clock WOBCLK_186T. Thereafter, a pre-pit decoder 23 receives the pre-pit address signal PREPIT_POS, the pre-pit use signal PREPIT_USE and the wobble signal reference clock WOBCLK_186T, and decodes them to generate the pre-pit data. An ECC decoder (Error Correction Code decoder) 24 generates a physical address according to the pre-pit data. The ECC decoder 24 is well known in the field of prior arts, and detailed descriptions thereof will be omitted.

Figure 3:
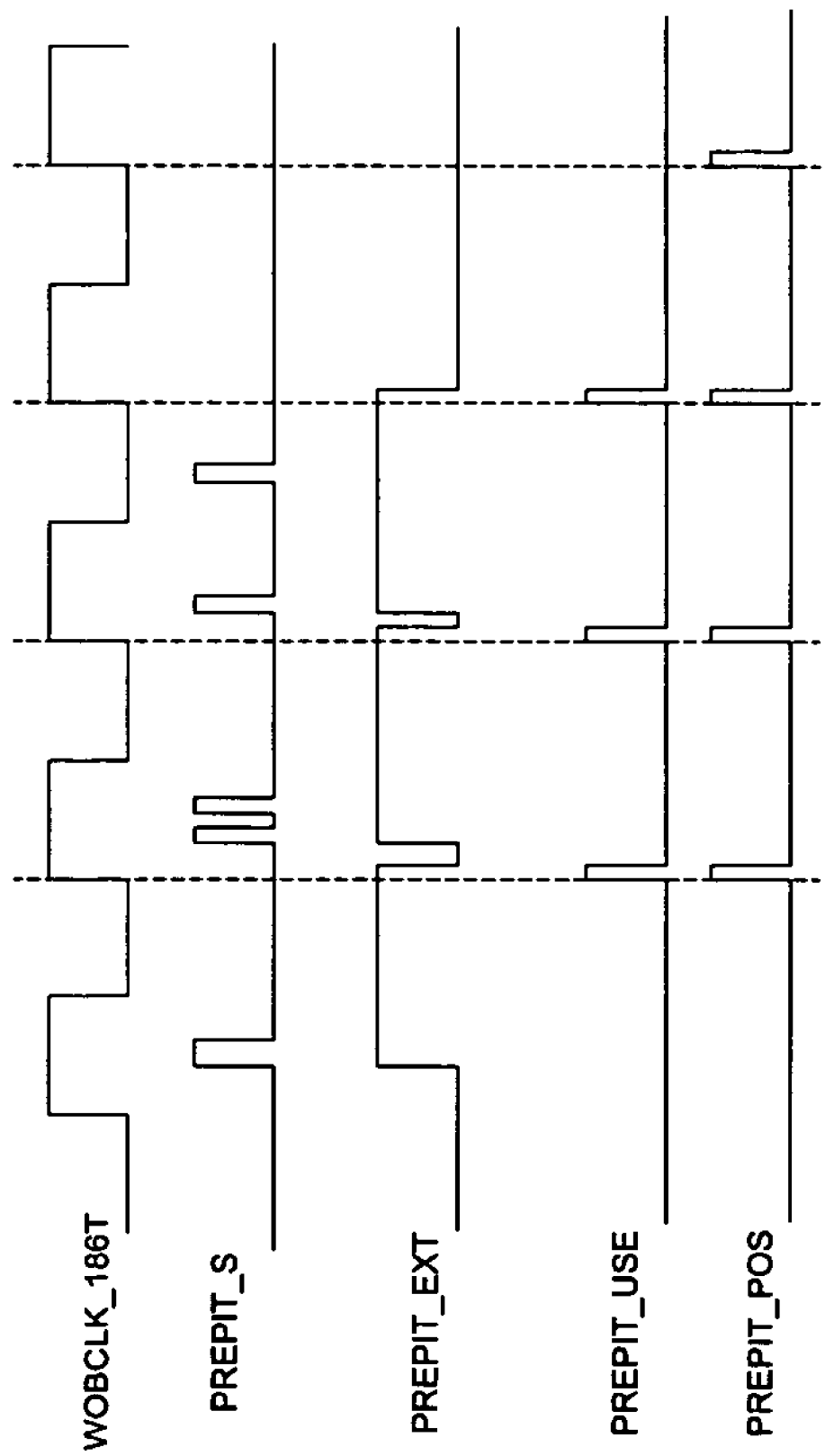
FIG. 3 shows timing charts of a wobble signal reference clock WOBCLK__186T, an extension signal PREPIT_EXT, a pre-pit signal, a pre-pit address signal PREPIT_POS, and a pre-pit use signal PREPIT_USE.

FIG. 3 shows timing charts of the wobble signal reference clock WOBCLK_186T, the extension signal PREPIT_EXT, the pre-pit signal PREPIT_S, a pre-pit address signal PREPIT_POS, and a pre-pit use signal PREPIT_USE. As shown in FIG. 3, the pulse extension unit 22 generates the pre-pit address signal PREPIT_POS through a pulse generator according to the wobble signal reference clock WOBCLK_186T. That is, the pulse extension unit 22 generates a pulse of the pre-pit address signal PREPIT_POS substantially at each rising edge of the wobble signal reference clock WOBCLK_186T. The extension signal PREPIT_EXT is generated by an extension unit. PREPIT_EXT becomes H (high) substantially at the rising edge of the pre-pit signal, and becomes L (low) substantially at the falling edge of the pre-pit address signal PREPIT_POS. In addition, the pre-pit using signal PREPIT_USE corresponds to the state of the extension signal PREPIT_EXT in each pulse of the pre-pit address signal PREPIT_POS. That is, the pre-pit using signal PREPIT_USE is the output signal after the extension signal PREPIT_EXT and the pre-pit address signal PREPIT_POS are AND operated. Thus, after the processing of the pulse extension unit 22, the pre-pit using signal PREPIT_USE is free from being influenced even if the pre-pit signal has noise.

Figure 4:
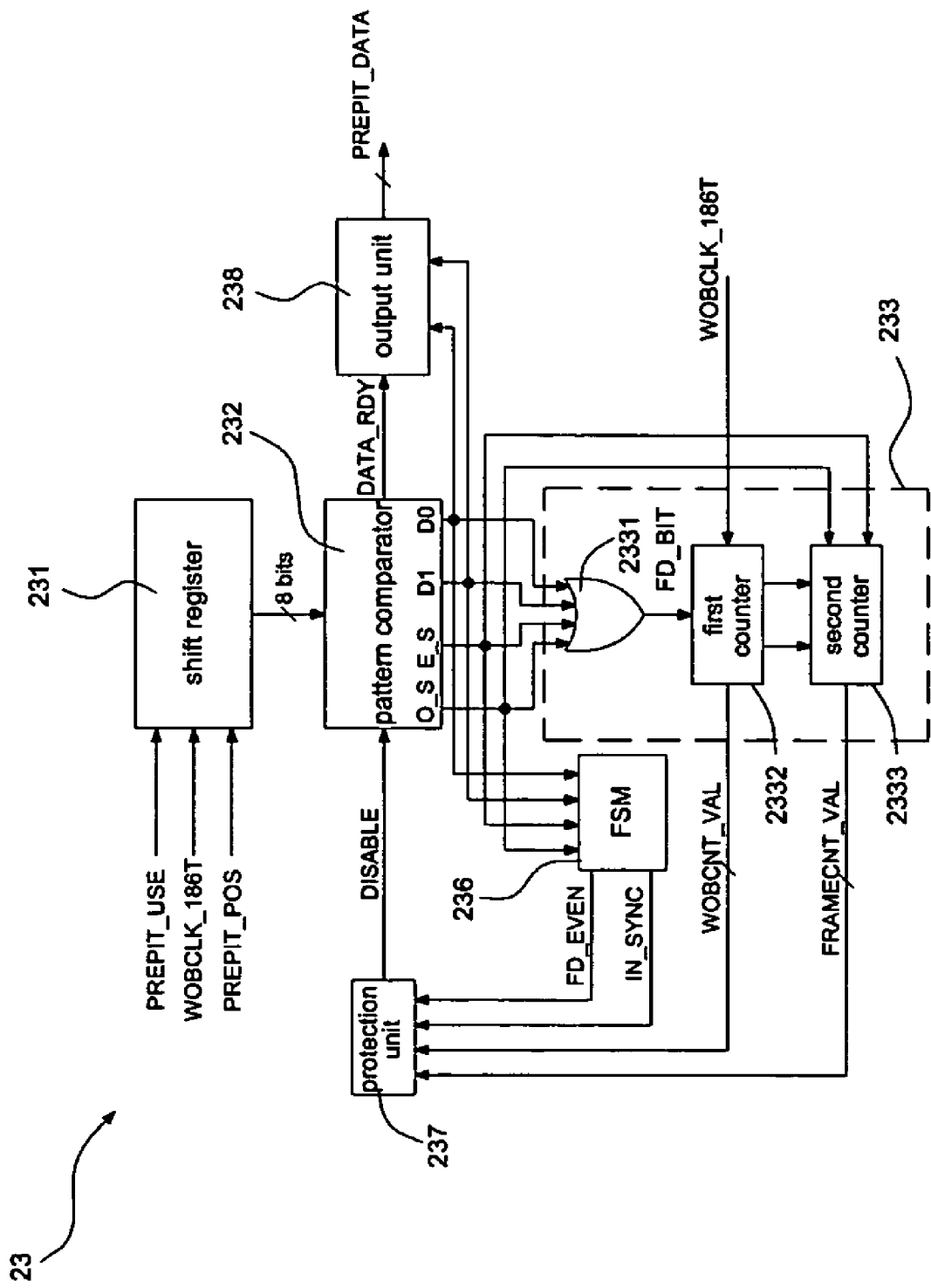
FIG. 4 shows a block diagram of a pre-pit signal decoder of the invention.

FIG. 4 shows a block diagram of a pre-pit signal decoder of the invention. Referring to FIG. 4, the pre-pit signal decoder 23 of the invention includes a shift register 231, a pattern comparator 232, a counting unit 233, a finite state machine FSM 236, a protection unit 237, and an output unit 238.

The shift register 231 receives the pre-pit using signal PREPIT_USE, the wobble signal reference clock WOBCLK_186T and the pre-pit address signal PREPIT_POS, and converts the serial pre-pit using signal PREPIT_USE into a parallel signal for output according to the triggering of the pre-pit address signal PREPIT_POS. In this embodiment, for example, the pre-pit using signal PREPIT_USE is converted into 8-bit data for output. That is, the shift register 231 outputs a set of 8-bit parallel data at each pulse of the pre-pit address signal PREPIT_POS.

The pattern comparator 232 compares the parallel data output from the shift register 231 to a plurality of reference patterns, and generates an odd sync bit O_S, an even sync bit E_S, a low bit D0, a high bit D1, and a data ready signal DATA_RDY. The reference pattern may be programmed by the user, and it may be any arbitrary 8-bit binary digit, which may be 1, 0 or X, wherein X denotes the bit that need not to be considered. In addition, when the in-sync signal IN_SYNC of the finite state machine FSM is enabled or disabled, the reference pattern may be set to different binary digits, respectively, to thereby enhance the decoding ability when the in-sync signal IN_SYNC is enabled. For example, when the in-sync signal IN_SYNC is disabled, the reference pattern may be set as 00000111, 00000110, 00000101 or 00000100. When the parallel data is the same as the reference pattern 00000111, the even sync bit E_S is set to a high level. When the parallel data is the same as the reference pattern 00000110, the odd sync bit O_S is set to the high level. When the parallel data is the same as the reference pattern 00000101, the high bit D1 is set to the high level. When the parallel data is the same as the reference pattern 00000100, the low bit D0 is set to the high level. Other bits at other time are set to a low level. The pattern comparator 232 further receives a disable signal DISABLE. When the disable signal DISABLE is enabled, no data will be output. That is, the pattern comparator 232 does not operate in order to prevent the pattern comparator 232 from generating an error signal. When the disable signal DISABLE is disabled, the pattern comparator 232 compares the parallel data to the reference pattern once at each wobble signal reference clock WOBCLK_186T and outputs signals according to the comparison result.

The output unit 238 receives the signals of the pattern comparator 232, such as the odd sync bit O_S, even sync bit E_S, low bit D0, high bit D1, data ready signal DATA_RDY, and the like, and converts the serial low bit D0 and high bit D1 into the pre-pit data PREPIT_DATA for output according to the data ready signal DATA_RDY, odd sync bit O_S and even sync bit E_S. So, the ECC decoder 24 (FIG. 2) in the next stage may generate the physical address according to the pre-pit data PREPIT_DATA.

The counting unit 233 of the pre-pit signal decoder 23 includes an OR gate 2331, a first counter 2332 and a second counter 2333. The OR gate 2331 receives the signals of the pattern comparator 232, such as the odd sync bit O_S, even sync bit E_S, low bit D0, high bit D1, and the like, and outputs a find-bit signal FD_BIT. That is, when one of the odd sync bit O_S, even sync bit E_S, low bit D0, and high bit D1 is H, the find-bit signal FD_BIT is H. The first counter 2332 is used to count the wobble signal reference clocks WOBCLK_186T, and to output a wobble signal counting value WOBCNT_VAL. The first counter 2332 receives the find-bit signal FD_BIT and clears the counting value at each pulse of the find-bit signal FD_BIT. The counting value output from the first counter 2332 represents the sequence of the wobble signals in each frame. The second counter 2333 is used to count the frames and to output a frame counting value FRAMECNT_VAL. The second counter 2333 counts the number of frames from 0 to 25. Each time when the first counter 2332 counts to 0, the second counter 2333 adds 1. When the even sync bit E_S is at the high level, the second counter 2333 will be set to 0. If the odd sync bit O_S is detected to be at the high level, the second counter 2333 is set to 1. The counting value output from the second counter 2333 represents the oddness/evenness of the frame in each sector.

Figure 5:
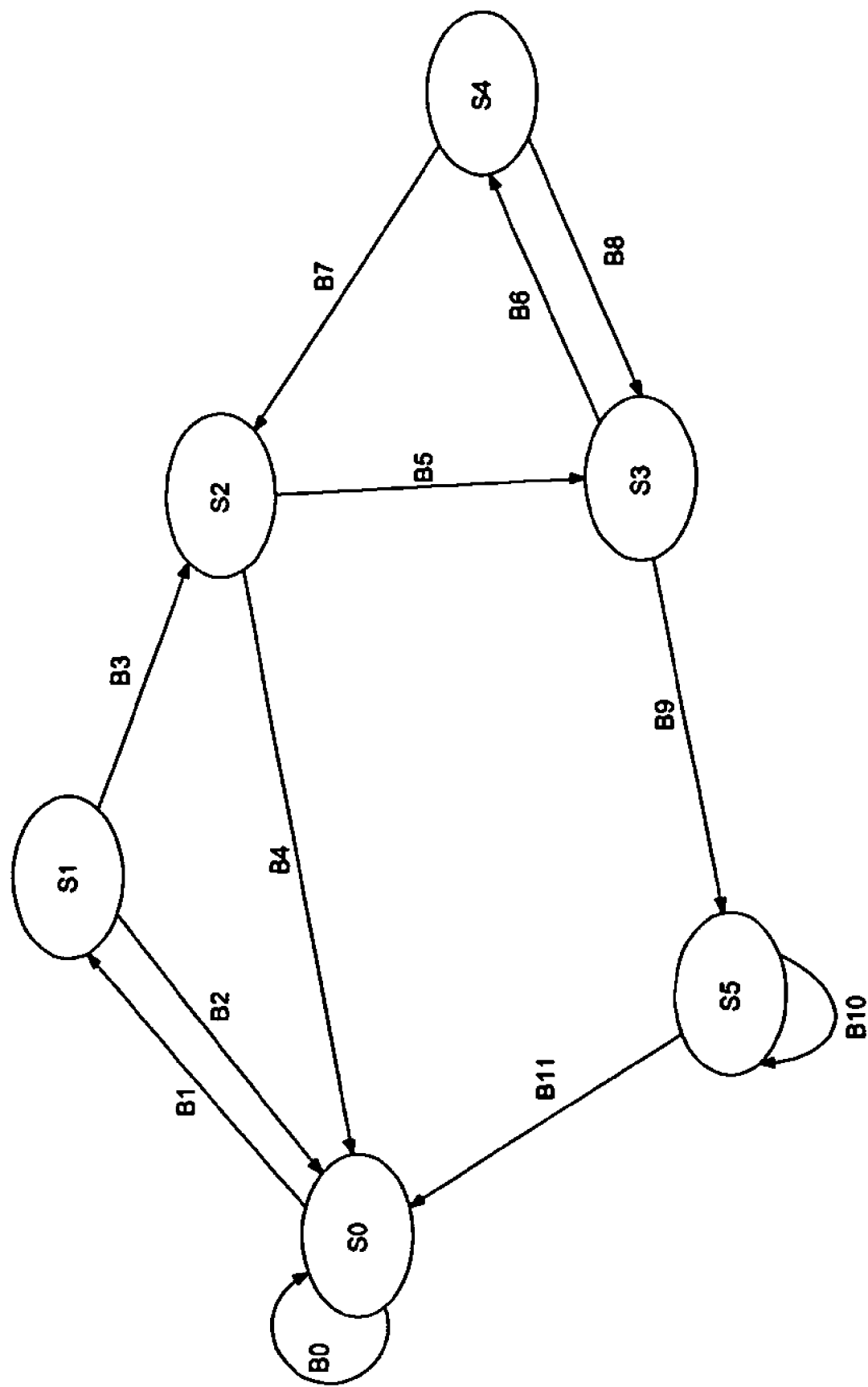
FIG. 5 shows a state diagram of a finite state machine.

The finite state machine FSM 236 receives the signals of the pattern comparator 232, such as the odd sync bit O_S, even sync bit E_S, low bit D0, high bit D1, and the like, and outputs a find even position bit signal FD_EVEN and the in-sync signal IN_SYNC according to the variation of each signal. FIG. 5 shows a state diagram of a finite state machine FSM 236. As shown in FIG. 5, the finite state machine 236 totally has six following states.

State S0: the pre-pit signal is searched (pre-pit search). In this state, if the pre-pit signal is not detected, the original state is held via the path B0. If the pre-pit signal is detected, the state changes to State S1 via the path B1.

State S1: the alignment of the pre-pit signal is checked (pre-pit align check). If no pre-pit signal is found within the default time, it means that the previous pre-pit signal is caused by noise, and the state returns to State S0 via the path B2. If the pre-pit signal is found again within the default time, the state changes to State S2 via the path B3.

State S2: the sync signal is waited (wait sync). If no sync signal is found within the default time, the state returns to State S0 via the path B4. If the sync signal is found within the default time, the state changes to State S3 via the path B5.

State S3: the sync signal is identified (pre sync). If a plurality of sync signals is continuously found, the state changes to State S5 via the path B9. If no even sync signal (E_S) is found, the state changes to State S4 via the path B6.

State S4: the odd sync signal is checked (odd sync check) and the existence of the odd sync signal is check. The sync signal may be an even sync signal or an odd sync signal, and the even sync signal appears at the early position. So, if no even sync signal is found, the state jumps to State S4 to find the odd sync signal. If no odd sync signal is found again, it means that no pattern of the sync signal is found. So, the state changes to State S2 via the path B7. If the odd sync signal is found, the state returns to State S3 via the path B8. Meanwhile, it is counted that the sync signal is found once.

State S5: the sync state (sync state), which represents that the overall detection of the pre-pit signal is quite stable, and all the pre-pit signals will appear at desired positions at the preset timing. At this time, the in-sync signal IN_SYNC is enabled. Meanwhile, if the sync signal appears at the position where the even sync signal appears, it is found that the even sync signal FD_EVEN_SYNC is enabled and the state returns to State S5 via the path B10. If the sync signal appears at the position where the odd sync signal appears, it is found that the odd sync signal FD_ODD_SYNC is enabled and the state returns to State S5 via the path B10. If the even sync signal FD_EVEN_SYNC or the odd sync signal FD_ODD_SYNC is not enabled for a continuous period of time, it means that the overall detection procedures for the pre-pit signals are confused, and the state returns to State S0 via the path B11. The find even position bit signal FD_EVEN will be enabled when the pre-pit bit, including sync bit, bit0 or bit1, is found at the even frame position.

The protection unit 237 receives the wobble signal counting value WOBCNT_VAL, the frame counting value FRAMECNT_VAL, the find even position bit signal FD_EVEN and the in-sync signal IN_SYNC, and outputs the disable signal DISABLE. According to the specification of the DVD-R/RW, each pre-pit bit is determined by three low bits (b2, b1, b0) in each sync frame, as shown in Table 1. Hence, the data at other time need not to be considered. According to this property, the invention enables the disable signal DISABLE when the in-sync signal IN_SYNC is enabled and the wobble signal counting value WOBCNT_VAL is between 0 and 4 so as to disable the pattern comparator 232 from operating during this period, and to prevent the pattern comparator 232 from outputting error data owing to the data noise during this period of time. Another factor for enabling the DISABLE signal is the FRAMECNT_VAL. When the find even position bit signal FD-EVEN is enabled, it means that a meaningful pre-pit byte is found when the frame counting value FRAMECNT_VAL is an even number. In addition, since only a set of pre-pit byte appears in every two frames, it is known that a pre-pit byte impossibly appears at a position of a next odd number. Consequently, when the find even position bit signal FD-EVEN is enabled, the disable signal DISABLE is enabled until 1 is added to the frame counting value FRAMECNT_VAL. Then, the disable signal DIS-ABLE is disabled in order to prevent continuous two frames (FRAME) from having the pre-pit byte error caused by noise.

Figure 6:
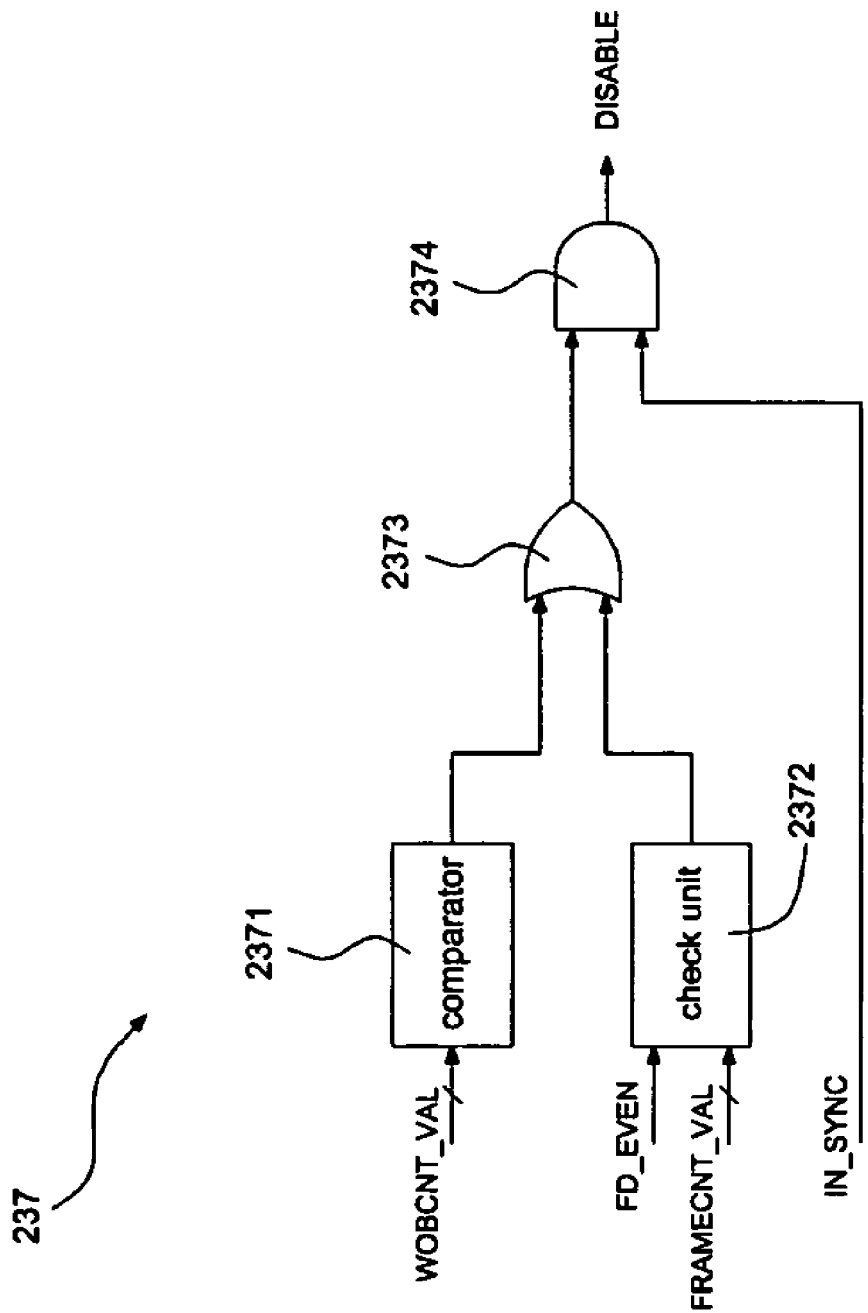
FIG. 6 shows an embodiment of a protection unit.

FIG. 6 shows an embodiment of a protection unit. Referring to FIG. 6, the protection unit 237 includes a comparator 2371, a check unit 2372, an OR gate 2373, and an AND gate 2374. The comparator 2371 receives the wobble signal counting value WOBCNT_VAL and outputs the high level when the counting value is smaller than 5, or otherwise outputs the low level. Of course, it may also output the low level until the counting value is equal to 7. The check unit 2372 receives the frame counting value FRAMECNT_VAL and the find even position bit signal FD_EVEN, and outputs the high level when the find even position bit signal FD_EVEN is at the high level. The check unit 2372 does not output a low level until 1 is added to the frame counting value FRAMECNT_VAL. The OR gate 2373 receives output signals from the comparator 2371 and the check unit 2372. The AND gate 2374 receives an output signal of the OR gate 2373 and the in-sync signal IN_SYNC. Consequently, when the in-sync signal IN_SYNC is enabled, the protection unit 237 enables the disable signal DISABLE when the wobble signal counting value WOBCNT_VAL is smaller than 5 or in a frame cycle after the find even position bit signal FD_EVEN is enabled.

Figure 7:
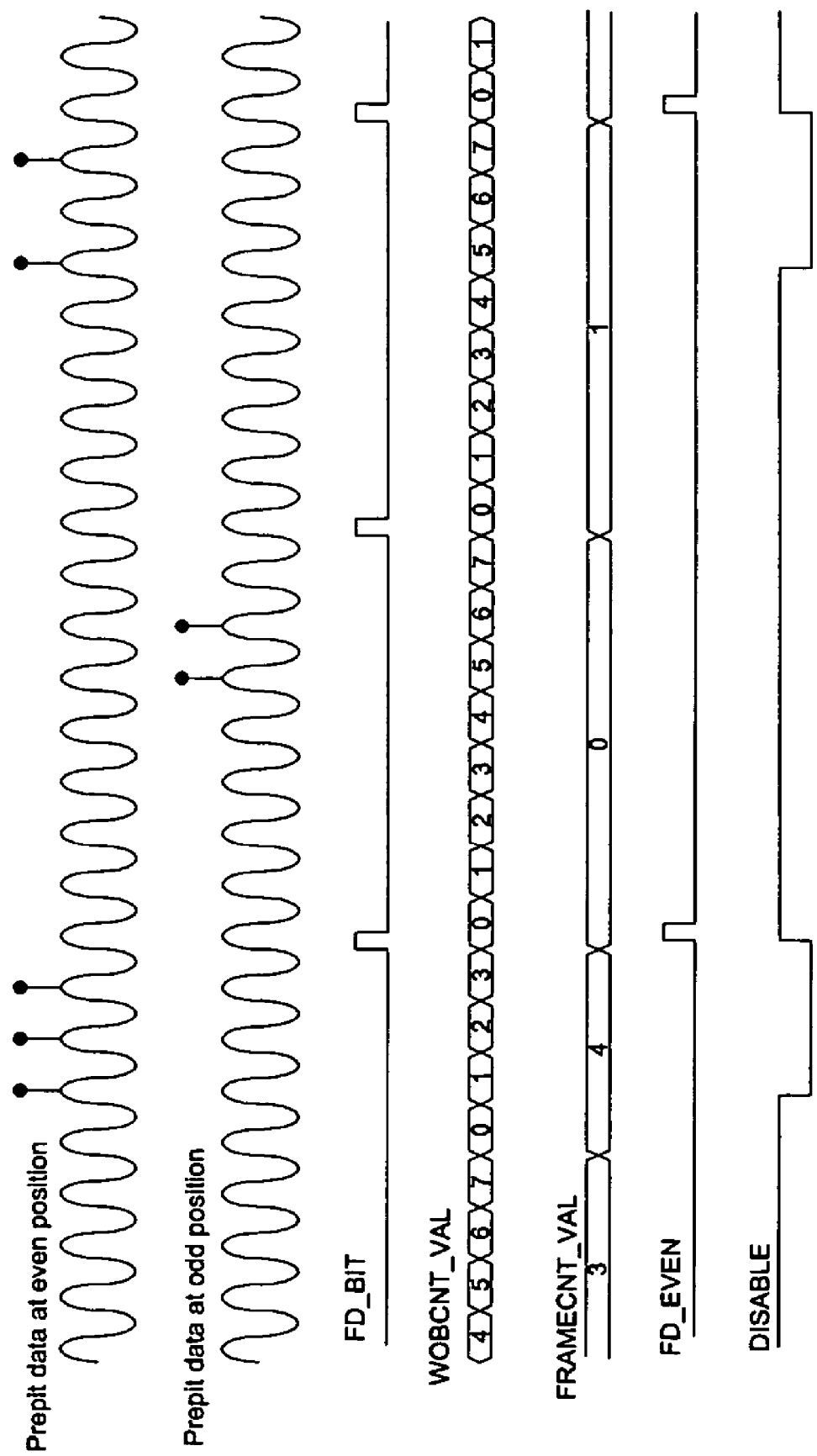
FIG. 7 shows schematic illustrations of some signals, which includes a find even sync bit signal FD_EVEN, a wobble signal counting value WOBCNT_VAL, a frame counting value FRAMECNT_VAL, a disable signal DISABLE, a find-bit signal FD_BIT, and a pre-pit signal.

FIG. 7 shows schematic illustrations of some signals, which includes the find even position bit signal FD_EVEN, the wobble signal counting value WOBCNT_VAL, the frame counting value FRAMECNT_VAL, the disable signal DISABLE, the find-bit signal FD_BIT, and the pre-pit signal. As shown in FIG. 7, the disable signal DISABLE is enabled at most period of time, and is disabled only when the frame counting value FRAMECNT_VAL is an odd number and the wobble signal counting value WOBCNT_VAL ranges from 5 to 7. Hence, the pattern comparator 232 only outputs signals at proper time, and the unnecessary error may be avoided.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A pre-pit signal decoder, comprising:
   a shift register for receiving serial pre-pit bits and converting them into a parallel pre-pit byte;
   a pattern comparator for generating an odd sync bit, an even sync bit, a low bit, and a high bit according to the parallel pre-pit byte, the pattern comparator further receiving a disable signal and operating when the disable signal is not enabled;
   a counting unit for generating a counting value according to the odd sync bit, the even sync bit, the low bit, and the high bit, and marking evenness or oddness of frames of the pre-pit bit and sequence of wobble signals in the frames;
   an in-sync signal generating unit for generating an in-sync signal according to the odd sync bit, the even sync bit, the low bit, and the high bit; and
   a protection unit for receiving the counting value and the in-sync signal, and enabling the disable signal at positions where the pre-pit bits do not exist according to the counting value of the counting unit when the in-sync signal is enabled.

2. The pre-pit signal decoder according to claim 1, wherein the counting unit comprises:

an OR gate for receiving the odd sync bit, the even sync bit, the low bit and the high bit, and generating a find-bit signal;

a first counter for counting a wobble signal reference clock and outputting a wobble signal counting value, and utilizing the find-bit signal to clear the counting value; and a second counter for receiving outputs of the first counter, the odd sync bit and the even sync bit, adding one after the first counter has counted a number of the wobble signals contained in the frames, and outputting a frame counting value, wherein the second counter sets a lowest bit of the frame counting value to H when the odd sync bit is found, and to L when the even sync bit is found.

3. The pre-pit signal decoder according to claim 2, wherein the protection unit enables the disable signal when the in-sync signal is enabled and the wobble signal counting value is smaller than 5.

4. The pre-pit signal decoder according to claim 2, wherein the in-sync signal generating unit is a finite state machine.

5. The pre-pit signal decoder according to claim 4, wherein the finite state machine further generates a find even position signal.

6. The pre-pit signal decoder according to claim 5, wherein the protection unit enables the disable signal when the in-sync signal is enabled and the find even position signal is enabled, and disables the disable signal when 1 is added to the frame counting value.

7. The pre-pit signal decoder according to claim 1, wherein the pre-pit byte is 8-bit data.

8. The pre-pit signal decoder according to claim 7, wherein the pattern comparator compares the pre-pit byte to a plurality of 8-bit reference patterns when the in-sync signal is not enabled.

9. The pre-pit signal decoder according to claim 8, wherein:

the reference patterns are 00000111, 00000110, 00000101 and 00000100;

when the pre-pit byte is the same as the reference pattern 00000111, the even sync bit is set to high level;

when the pre-pit byte is the same as the reference pattern 00000110, the odd sync bit is set to high level;

when the pre-pit byte is the same as the reference pattern 00000101, the high bit is set to high level; and when the pre-pit byte is the same as the reference pattern 00000100, the low bit is set to high level.

10. The pre-pit signal decoder according to claim 7, wherein the pattern comparator compares lower 3-bit data of the pre-pit byte to a plurality of 3-bit reference patterns when the in-sync signal is enabled.

11. The pre-pit signal decoder according to claim 10, wherein:

the reference patterns are 111, 110, 101 and 100;

when the lower 3-bit data of the pre-pit byte is the same as the reference pattern 111, the even sync bit is set to high level;

when the lower 3-bit data of the pre-pit byte is the same as the reference pattern 110, the odd sync bit is set to high level;

when the lower 3-bit data of the pre-pit byte is the same as the reference pattern 101, the high bit is set to high level; and when the lower 3-bit data of the pre-pit byte is the same as the reference pattern 100, the low bit is set to high level.

12. The pre-pit signal decoder according to claim 1, wherein the pattern comparator further generates a data ready signal.

13. The pre-pit signal decoder according to claim 12, further comprising an output unit for receiving the odd sync bit, the even sync bit, the low bit, the high bit, and the data ready signal, and converting the serial low bit and high bit into pre-pit data for output according to the data ready signal, the odd sync bit and the even sync bit.

14. The pre-pit signal decoder according to claim 7, wherein the pattern comparator compares lower 2-bit data of the pre-pit byte to a plurality of 2-bit reference patterns when the in-sync signal is enabled.

15. The pre-pit signal decoder according to claim 14, wherein:

the reference patterns are 11, 10, 01 and 00;

when the lower 2-bit data of the pre-pit byte is the same as the reference pattern 11, the even sync bit is set to high level;

when the lower 2-bit data of the pre-pit byte is the same as the reference pattern 10, the odd sync bit is set to high level;

when the lower 2-bit data of the pre-pit byte is the same as the reference pattern 01, the high bit is set to high level; and when the lower 2-bit data of the pre-pit byte is the same as the reference pattern 00, the low bit is set to high level.

* * * * *